Nov. 28, 1967   J. P. WILKERSON   3,354,697
PIPE TESTING APPARATUS
Filed Sept. 20, 1965   3 Sheets-Sheet 3
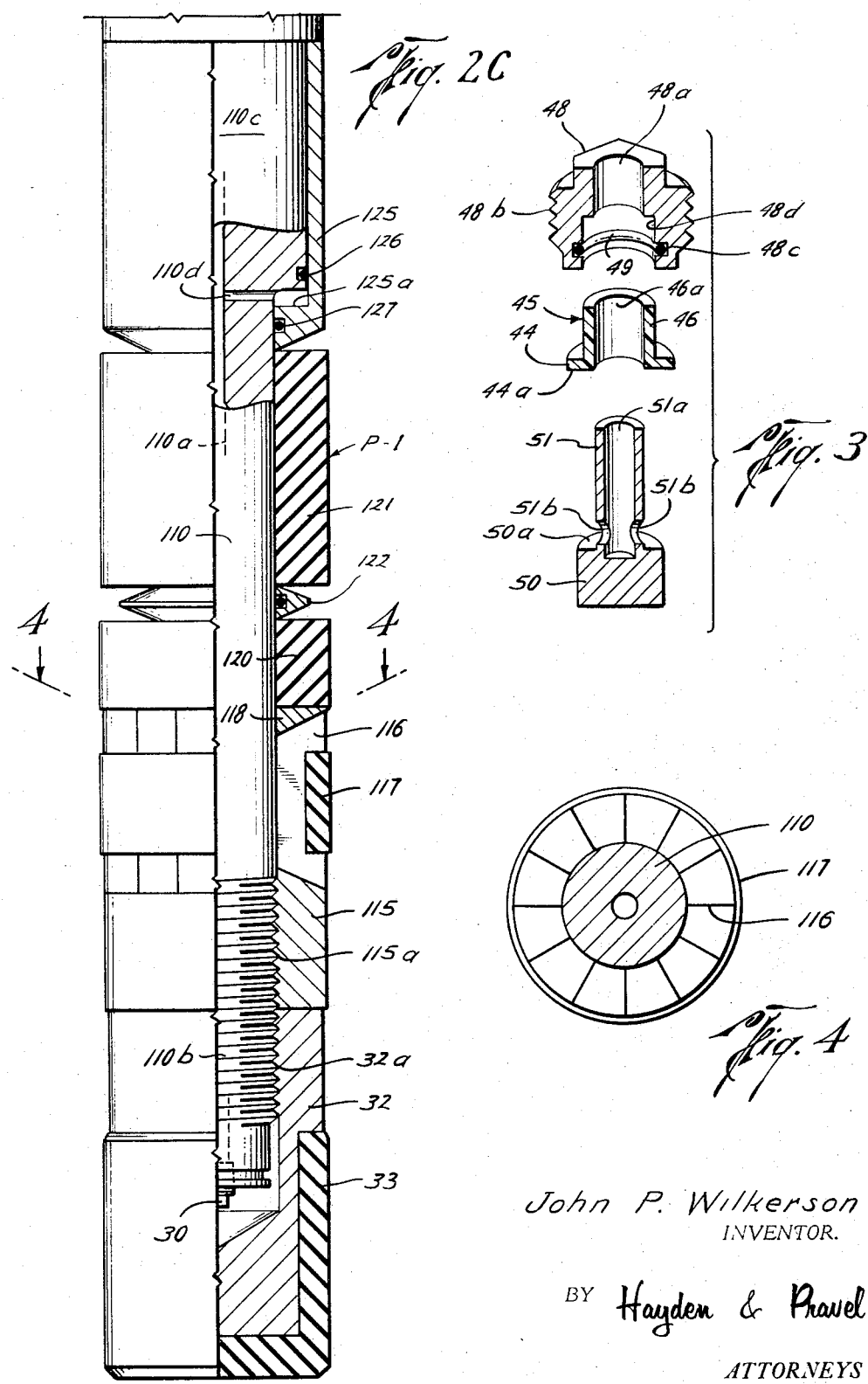
John P. Wilkerson
INVENTOR.
BY Hayden & Pravel
ATTORNEYS United States Patent Office 3,354,697
Patented Nov. 28, 1967

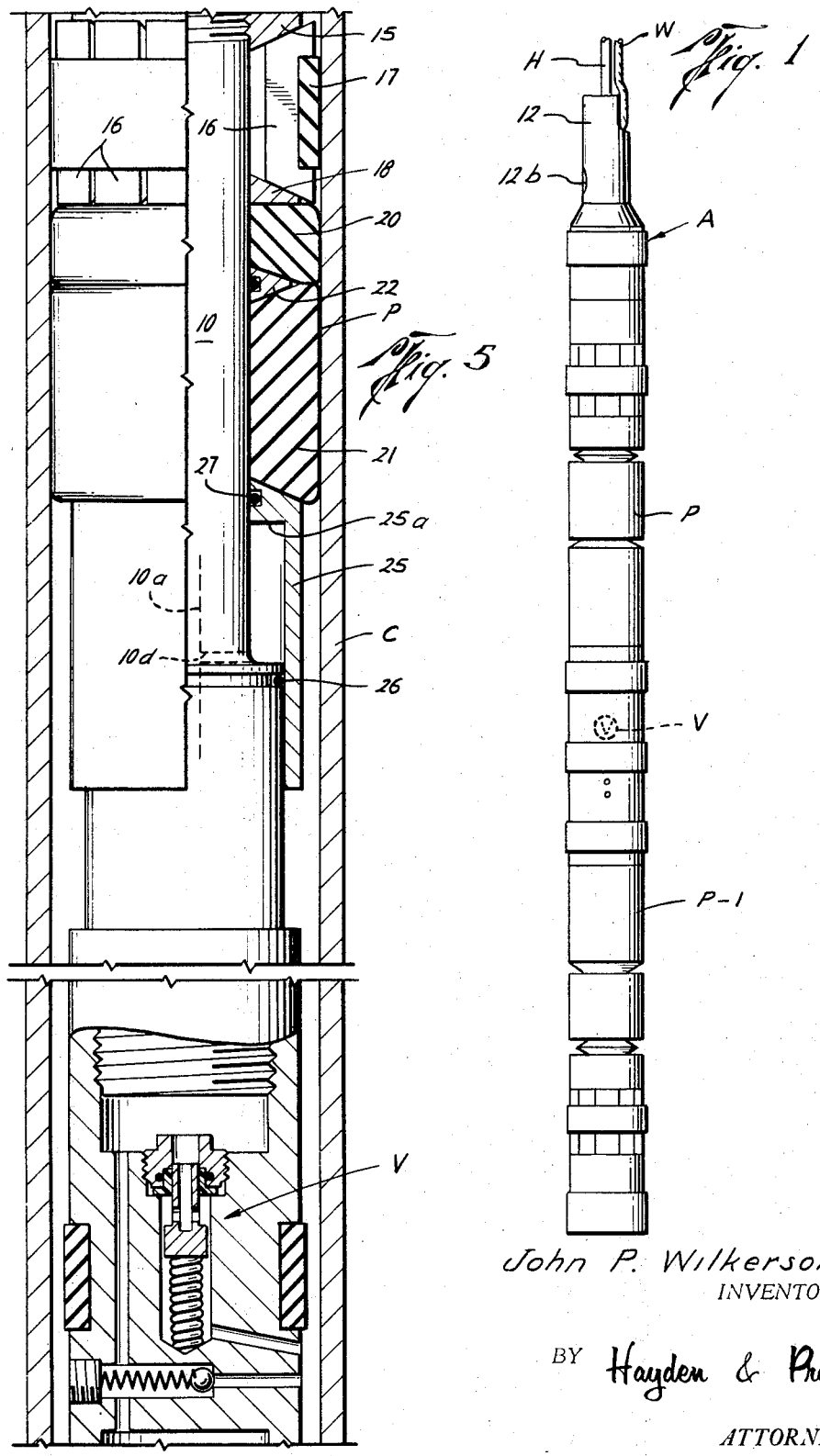

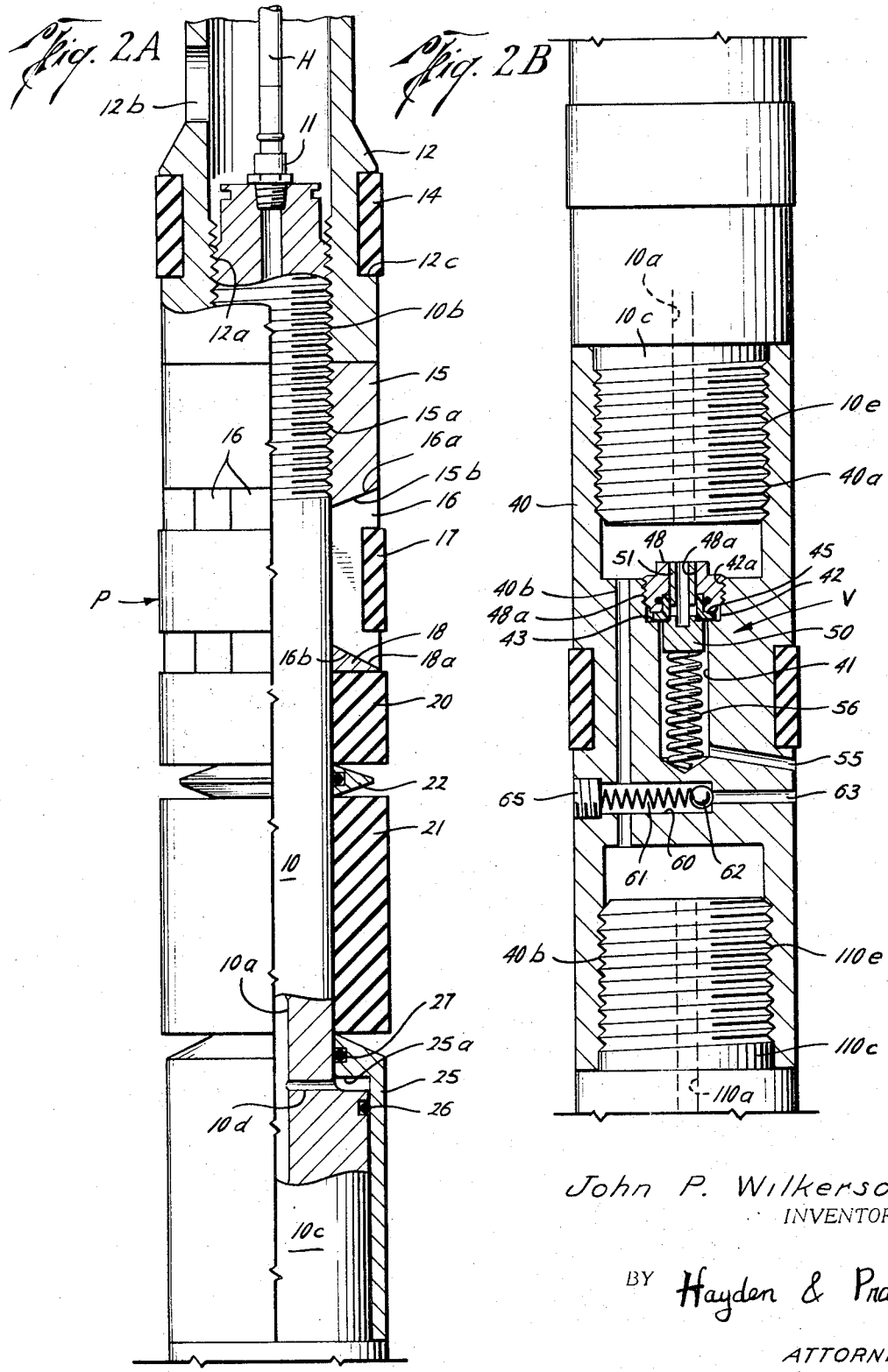

3,354,697
PIPE TESTING APPARATUS
John P. Wilkerson, Pasadena, Tex., assignor to Loomis Hydraulic Testing Company, Inc., a corporation of Texas
Filed Sept. 20, 1965, Ser. No. 488,417
2 Claims. (Cl. 73—40.5)

This invention relates to new and useful improvements in pipe testing apparatus, and particularly to new and useful improvements in valve assemblies for such apparatus.

As disclosed in United States Patent No. 2,841,007 the condition of casing or pipe in wells is tested by apparatus having spaced packers or seals between which test fluid is introduced to determine whether there are any holes or other leaks in such sealed-off portion of the casing or pipe. Heretofore, the introduction of such test fluid has been controlled by metal ball valves. Much difficulty and expense has been experienced when using such ball valves in the pipe testing apparatus because when they are too hard, they split, and when they are too soft, they deform.

It is therefore an object of the present invention to provide a new and improved valve assembly for pipe testing apparatus which is inexpensive and substantially indestructible.

An important object of this invention is to provide in a pipe testing apparatus, a new and improved valve assembly for controlling the introduction of test fluid between longitudinally spaced packers or seals, wherein such valve assembly has a valve seat formed with a flat seat surface which is adapted to be engaged for a closing of the valve by a co-acting flat valve surface on a relatively movable valve element.

Another object of this invention is to provide in a pipe testing apparatus, a new and improved valve assembly for controlling the introduction of test fluid between longitudinally spaced packers or seals, wherein such valve assembly has a valve seat formed of polyvinyl chloride for engagement by a metallic valve element to thereby provide a substantially indestructible valve assembly which is relatively inexpensive as compared to conventional valve assemblies having ball valves therein.

A particular object of this invention is to provide in a pipe testing apparatus, a new and improved valve assembly for controlling the introduction of test fluid between longitudinally spaced packers or seals, wherein such valve assembly has a valve seat formed with a longitudinal bore for receiving a guide stem or sleeve, and wherein a valve element or body is a part of and movable with said guide stem or sleeve for sealing engagement with the valve seat.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation illustrating the preferred type of pipe testing apparatus with which the valve assembly of this invention is utilized;

FIGS. 2A, 2B and 2C are views, partly in elevation and partly in section, which together illustrate the preferred pipe testing apparatus of this invention with the valve assembly of this invention therewith;

FIG. 3 is an exploded view, illustrating components of the valve assembly of this invention;

FIG. 4 is a cross-sectional view taken on line 4—4 of FIG. 2C; and

FIG. 5 is a view, partly in elevation and partly in section, illustrating the pipe testing apparatus with the upper packer portion in a sealing position and with the valve assembly of this invention in an open position for the testing of the pipe in which the apparatus is disposed.

In the drawings, the letter A designates generally the pipe testing apparatus of this invention which is adapted to be lowered into a well pipe or casing C (FIG. 5) for testing a portion of such pipe or casing C with fluid to determine whether there are any leaks in such portion. The apparatus A is preferably lowered into the pipe or casing C on a wire line or other flexible support W, together with a fluid conductor or hose H which supplies fluid under pressure for the actuation of the apparatus A and the testing of the pipe or casing C. Briefly, the apparatus A includes a pair of longitudinally spaced packers P and P-1 which are adapted to be urged into sealing engagement with the inside of the pipe or casing C to be tested. A valve assembly V is disposed between the packers P and P-1 for the purpose of introducing test fluid into the portion of the pipe or casing C between the packers P and P-1 after they have been moved to the sealing position.

Considering the invention more in detail, the pipe testing apparatus A includes an inner mandrel 10 (FIG. 2A) which has a longitudinal flow passage or bore 10a therethrough. The hose H for conducting fluid to the apparatus A is suitably connected to the upper end of the mandrel 10 by a fitting 11 or other suitable connector means so that fluid from the hose H is conducted through the longitudinal bore 10a for disposition within the apparatus A as will be more evident hereinafter. The upper end of the mandrel 10 is threaded at 10b for engagement with internal threads 12a on an upper retaining or supporting collar 12. The wire line or other flexible support W is suitably connected to the sleeve 12 as indicated in FIG. 1 so that the entire apparatus A is adapted to be supported by the wire line W for raising and lowering same within a well pipe of casing C. A relief port 12b is preferably provided for the relief of fluid pressure within the collar 12. An annular protector ring 14 formed of rubber or other suitable resilient material is disposed in an annular groove 12C in the collar 12 and preferably projects beyond the external diameter of the collar 12 to provide a resilient contact with the inside surface of the casing or pipe C during the raising and lowering of the apparatus A within such pipe or casing C.

As illustrated in FIG. 2A in particular, the upper packer P includes a metallic back-up ring 15 which has internal threads 15a in threaded engagement with the external threads 10b on the mandrel 10. The packer or seal P also includes a plurality of anti-extrusion elements 16 which form segments of an annular anti-extrusion assembly having a resilient band 17 formed of rubber or similar material disposed therearound for holding same in a retracted position under normal conditions of operation (FIG. 2A). It is to be noted that the back-up ring 15 has a downwardly and inwardly tapered surface 15b which co-acts with correspondingly tapered or inclined surfaces 16a on the anti-extrusion elements 16 for urging the elements 16 outwardly upon the application of a longitudinal compressive force to such anti-extrusion elements 16. Likewise, a wedge ring 18 having a wedge inclined surface 18a in engagement with lower inclined surfaces 16b is disposed for co-action with the lower ends of the elements 16 to assist in urging them outwardly upon the application of a longitudinal force thereto, as will be more evident hereinafter. During the outward movement of the elements 16, the resilient band 17 is expanded, but it has sufficient resilience to return the elements 16 to the retracted position of FIG. 2A upon a release of the longitudinal compressive force on the elements 16.

The packer P also includes a packer ring 20 formed of relatively hard rubber and a packer sleeve or element 21 formed of relatively soft rubber, with a metal disc 22 therebetween to facilitate expansion and sealing action upon such expansion of the elements 20 and 21. A piston 25 is disposed on the mandrel 10 at an enlarged diameter portion 10c thereof. The piston 25 is in communication with the longitudinal bore 10a by means of one or more ports 10d so as to introduce fluid from the bore 10a below an inwardly extending lateral piston surface 25a. Suitable O-ring seals 26 and 27 are provided to prevent fluid leakage at the piston 25. Thus, when fluid under pressure is introduced into the bore 10a, it acts upon the piston surface 25a to move the piston 25 upwardly for applying a longitudinal compressive force to the elements 21, 20 and the anti-extrusion elements 16 to urge them into the sealing position of FIG. 5.

In the preferred form of the invention, the packer P-1 is preferably formed in the same manner as the packer P and therefore a detailed explanation with respect to the construction of the packer P-1 is unnecessary. For ease of reference, the components of the packer P-1 are identified in the drawings, particularly FIG. 2C, with the same numerals and letters as are used for the packer P, but preceded by the digit "1." Thus, the packer P-1 is mounted on a mandrel 110 which has an enlargement 110c and a longitudinal bore 110b therethrough. The lower end of the bore 110a is closed by a suitable closure or plug 30. The lower end of the mandrel 110 has threads 110b formed thereon which are connected with internal threads 32a on a sub or body 32 at the lower end of the apparatus A. The sub or body 32 has a resilient protector cup 33 formed of rubber or other resilient material bonded or otherwise suitably attached thereto.

The threads 110b are also in threaded engagement with internal threads 115a on back-up ring 115 at the lower end of the packer P-1. The anti-extrusion segments 116 and the resilient retaining band 117 correspond with the anti-extrusion segments 16 and the band 17, respectively, and they are confined between the back-up ring 115 and the annular wedge 118. The wedge 118 is disposed below a relatively hard rubber ring 120, a metal disc 122 and a relatively soft rubber sealing ring 121. When fluid is introduced into the longitudinal bore 110a, it flows into the lateral passage or passages 110d and acts on the piston surface 125a for moving the piston 125 downwardly. O-ring seals 126 and 127 of the packer P-1 correspond with the seals 26 and 27 of the packer P. The packer P-1 is urged into and expanded sealing position in the pipe or casing C, preferably at the same time and in the same manner as described heretofore in connection with the packer P.

The lower end 10e of the mandrel 10 is formed with external threads for providing a threaded connection with a valve housing 40 by engagement with internal threads 40a in such housing 40. Similarly, the lower mandrel 110 is provided with external threads 110e at its upper end which are in threaded engagement with internal threads 40b of the housing 40. Thus, the housing 40 serves to connect the mandrels 10 and 110 with the valve assembly V intermediate the packers P and P-1. The longitudinal bores 10a and 110a are in communication with each other by means of one or more fluid passages 40b extending through the housing 40 so that when fluid under pressure is introduced into the apparatus A from the hose H, the pressure acts to urge both of the packers P and P-1 into sealing contact with the pipe or casing C.

The valve assembly V is formed in the valve body 40 and has a longitudinal bore 41 and a counterbore 42 having internal threads 42a. An annular lateral shoulder 43 is formed between the bore 41 and the counterbore 42 for receiving the lower surface 44a on a flange 44 of a valve seat 45. The valve seat 45 has a cylindrical, longitudinally extending, portion 46 with a bore 46a therethrough for providing sealing action as will be more fully described. The surface 44a (FIG. 3) of the valve seat 45 rests in part upon the lateral surface 43, but it extends laterally inwardly to expose a portion of such surface 44a in the bore 41 to provide a valve seat surface. A retainer cap 48, having a longitudinal bore 48a and external threads 48b, is disposed in the counterbore 42 with the threads 48b in threaded engagement with the internal threads 42a for retaining the valve seat 45 in position on the lateral shoulder 43. In the preferred embodiment, the cap 48 is provided with an annular recess 48c in which is disposed an O-ring 49 formed of rubber or other suitable resilient material. Such O-ring 49 is in frictional contact with the external surface of the cylindrical portion 46 of the valve seat 45 to facilitate the mounting of the valve seat 45 within a counterbore 48d of the cap 48.

A valve element or body 50, having a valve surface 50a, which is a laterally extending annular surface, is preferably formed integrally with, or is connected to a guide stem or tube 51 having a longitudinal opening 51a and a lateral opening or openings 51b. The stem 51 is adapted to move longitudinally with the valve element or body 50 and is in sealing engagement with the internal surface of the cylindrical portion 46 of the valve seat. When the valve element 50 has moved downwardly a sufficient distance to expose the opening or openings 51b below the valve seat 46, fluid may then flow through the passage 51a and outwardly through the port or ports 51b to the bore 41. The bore 41 has communication with a discharge port or ports 55 for the discharge of the test fluid into the area between the packers P and P-1 after they have been moved to the sealed or packed off position, as will be more evident hereinafter. The valve element 50 is resiliently urged to a closed or seated position by a coil spring 56 or other resilient means disposed in the bore 41. The spring 56 is of a predetermined strength so that the valve element 50 is opened after the packers P and P-1 are in the set or expanded sealed position.

In the preferred embodiment of this invention, the valve seat 45 is formed of polyvinyl chloride so that it is harder than the rubber of the O-ring 49, but it is softer than the metal of the valve element 50. Preferably, the hardness of the polyvinyl chloride is eighty Shore durometers. With the valve seat 45 thus constructed, an effective seal is obtained between the flat valve seat surface 44a and the flat valve surface 50a when they are in engagement with each other. Also, there is a seal provided between the internal surface of the cylindrical portion 46 of the valve seat 45 and the external surface of the guide stem 51. Not only is the valve seat 45 relatively inexpensive as compared to prior art constructions, but it is substantially indestructible, having been tested at pressures as high as 12,000 p.s.i. without any noticeable marks or other damage thereto.

A conventional relief valve is provided in the valve body 40 by means of a valve bore 60 in which is disposed a spring 61 and a ball valve formed of metal 62. The ball valve 62 seats at the end of a lateral passage 63 in the valve body 40. A removable plug 65 is threaded into the valve body 40 to hold the resilient member or spring 61 in position so as to facilitate replacement or repair of the spring 61 or valve 62. The valve 62 is provided to prevent a locking of fluid between the sealed packers P and P-1 when the pressure in the apparatus is relieved.

In the operation or use of the apparatus A of this invention, such apparatus A is lowered into the well pipe or casing C in the usual manner on the wire line W and with the hose H extending therewith to the surface of the well. When the apparatus A has reached a desired elevation in the pipe or casing C for test, the lowering of the apparatus A is stopped and fluid under pressure is introduced through the hose H to actuate the pistons 25 and 125 for the urging of the packers P and P-1 to their expanded sealing positions (FIG. 5). During such seating, the spring 56 is of sufficient strength to retain the valve element 50 in the closed seated position shown in FIG. 2B. After the packers P and P–1 have been set, the pressure of the fluid from the hose H is then increased to overcome the spring 56 and move the valve 50 to an open position (FIG. 5) with the port or ports 51b below the valve seat 45. Thus, the test fluid enters the passage 51a, flows outwardly through the port or ports 51b into the bore 41 for discharge through the discharge opening or port 55 into the pipe or casing C between the packers P and P–1. In the usual manner, the operator at the surface of the well determines whether leakage is occurring by whether or not the pressure of the fluid is maintained for a predetermined period of time while the test is being conducted.

After the test has been conducted, the pressure in the apparatus A is reduced to permit the spring 56 to move the valve element 50 to a closed position (FIG. 2B). The ball valve 62 is then opened by the pressure of the fluid confined between the packers P and P–1 to relieve such pressure and allow the packers P and P–1 to return to the normal unexpanded position (FIGS. 1, 2A and 2C), which occurs by reason of the inherent resiliency of the sealing elements 20 and 21 of the packer P and the sealing elements 120 and 121 of the packer P–1. The resilient band 17 on the anti-extrusion elements 16 urges inwardly to the retracted position of FIG. 2A and also the resilient band 117 urges the anti-extrusion elements 116 into their retracted position as shown in FIG. 2C upon the reduction in the fluid pressure within the apparatus A. Thus, the apparatus A may be moved upwardly or downwardly in the pipe or casing C to a new position for another test.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. In a pipe testing apparatus having longitudinally spaced packers, and a valve assembly for controlling the introduction of test fluid between said packers, the improvement residing in said valve assembly, including:
(a) a valve housing having a longitudinal bore therein with a counterbore to form an annular lateral shoulder,
(b) a cylindrical valve seat having a lateral flange with its outer portion disposed in engagement with said shoulder and its inner portion disposed inwardly of said shoulder to form an annular valve seat surface,
(c) a retainer cap removably mounted in said counterbore and engaging said lateral flange to retain same in engagement with said shoulder,
(d) said retainer cap having a longitudinal bore with an annular recess for receiving the cylindrical portion of said valve seat,
(e) a valve element having a guide tube extending into said longitudinal bore of said retainer cap and a laterally extending valve surface adapted to engage said valve seat surface to close fluid flow through said longitudinal bore, and
(f) said valve seat being formed of a plastic resilient material which is softer than said valve surface on said valve element for sealingly engaging each other when said valve element is in the closed position.

2. In a pipe testing apparatus having longitudinally spaced packers, and a valve assembly for controlling the introduction of test fluid between said packers, the improvement residing in said valve assembly, including:
(a) a valve housing having a longitudinal bore therein with a counterbore to form an annular lateral shoulder,
(b) a cylindrical valve seat having a lateral flange with its outer portion disposed in engagement with said shoulder and its inner portion disposed inwardly of said shoulder to form an annular valve heat surface,
(c) a retainer cap removably mounted in said counterbore and engaging said lateral flange to retain same in engagement with said shoulder,
(d) said retainer cap having a longitudinal bore with an annular recess for receiving the cylindrical portion of said valve seat,
(e) a valve element having a guide tube extending into said longitudinal bore of said retainer cap and a laterally extending valve surface adapted to engage said valve seat surface to close fluid flow through said longitudinal bore,
(f) an O-ring formed of a resilient elastic material disposed between the external surface of the cylindrical portion of said valve seat and the inner surface of said annular recess, and
(g) said valve seat being formed of polyvinyl chloride material which is softer than said valve surface but is harder than said O-ring so as to be substantially indestructible when subjected to repeated usage.

References Cited
UNITED STATES PATENTS

| | | | |
|---|---|---|---|
| 2,540,322 | 2/1951 | Christensen | 73—40.5 |
| 2,820,473 | 1/1958 | Reiners | 137—538 |
| 2,928,417 | 3/1960 | Buckner et al. | 137—538 |
| 3,057,374 | 10/1962 | Gondek | 137—538 |
| 3,165,920 | 1/1965 | Loomis | 73—40.5 |
| 3,223,111 | 12/1965 | Anderson | 251—368 |

LOUIS R. PRINCE, *Primary Examiner.*

J. NOLTON, *Assistant Examiner.*